(12) United States Patent
Chen et al.

(10) Patent No.: US 7,648,150 B2
(45) Date of Patent: Jan. 19, 2010

(54) SHOCK-ABSORBING DEVICE FOR STROLLER

(75) Inventors: Shun-Min Chen, Taipei (TW); Wen-Qu Hu, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 12/057,512

(22) Filed: Mar. 28, 2008

(65) Prior Publication Data

US 2008/0238016 A1 Oct. 2, 2008

(30) Foreign Application Priority Data

Mar. 30, 2007 (CN) .................... 2007 2 0140970 U

(51) Int. Cl.
*B60G 9/00* (2006.01)

(52) U.S. Cl. ................ 280/124.179; 16/35 R

(58) Field of Classification Search .......... 280/124.116, 280/124.129, 124.153, 124.164, 124.179; 16/18, 44, 35 R, 48

See application file for complete search history.

(56) References Cited

U.S. PATENT DOCUMENTS

| 2,271,304 | A | * | 1/1942 | Mulholland | 16/44 |
| 4,913,452 | A | * | 4/1990 | Zun | 280/47.41 |
| 5,103,530 | A | * | 4/1992 | Andrisin et al. | 16/20 |
| 5,172,451 | A | * | 12/1992 | Chiu | 16/35 R |
| 5,581,843 | A | * | 12/1996 | Purnell | 16/35 R |

* cited by examiner

*Primary Examiner*—Paul N Dickson
*Assistant Examiner*—Robert A Coker
(74) *Attorney, Agent, or Firm*—Shook, Hardy & Bacon LLP

(57) ABSTRACT

A shock-absorbing device for a stroller includes: a wheel mounting seat including a sleeve part having first and second sides, and an extending part extending outwardly from the first side of the sleeve part; a shock-absorber seat having a first end portion that is formed with a wheel axle-disposing hole, and a second end portion that is pivoted to the second side of the sleeve part, the wheel axle-disposing hole being defined by an axle hole-defining wall; and a resilient shock absorber abutting resiliently against the extending part and the axle hole-defining wall.

10 Claims, 6 Drawing Sheets

SHOCK-ABSORBING DEVICE FOR STROLLER

CROSS-REFERENCE TO RELATED APPLICATION

This application claims priority of Chinese Application No. 200720140570.7, filed on Mar. 30, 2007.

BACKGROUND OF THE INVENTION

1. Field of the Invention

This invention relates to a shock-absorbing device for a stroller, mere particularly to a wheel assembly with a shock-absorbing device.

2. Description of the Related Art

Referring to FIG. 1, U.S. Pat. No. 5,103,530 discloses a wheel assembly of a light vehicle including a wheel mounting seat 8, a stroller leg 12 coupled rotatably to the wheel mounting seat 8 through a coupler 10, an axle retainer arm 20 pivoted to a rear end of the wheel mounting seat 8 through pivot pin 14, a compression spring 15 abutting resiliently against a front protrusion 81 of the wheel mounting seat 8 and a recessed wall 201 of the axle retainer arm 20, a wheel axle 18 supported on the axle retainer arm 20 and offset from the recessed wall 201 of the axle retainer arm 20, and a wheel 4 with a hub 28 mounted rotatably on the wheel axle 18. In use, the recessed wall 201 of the axle retainer arm 20 is moved upwardly toward the front protrusion 81 of the wheel mounting seat 8 and compresses the compression spring 15 so as to absorb shock incurred during movement of the light vehicle on an uneven surface. However, since the recessed wall 201 is disposed between the wheel axle 18 and the pivot pin 14 and is suspended without any support, it is susceptible to break by the force resulting from the shock that acts thereon and thus requires a high mechanical strength to avoid breakage.

SUMMARY OF THE INVENTION

Therefore, an object of the present invention is to provide a shock-absorbing device that can overcome the aforesaid drawback associated with the prior art.

According to the present invention, a shock-absorbing device for a stroller comprises: a wheel mounting seat including a sleeve part having first and second sides, and an extending part extending outwardly from the first side of the sleeve part; a shock-absorber seat having a first end portion that is formed with a wheel axle-disposing hole adapted for extension of a wheel axle therethrough, and a second end portion that is pivoted to the second side of the sleeve part, the wheel axle-disposing hole being defined by an axle hole-defining wall; and a resilient shock absorber abutting resiliently against the extending part and the axle hole-defining wall.

BRIEF DESCRIPTION OF THE DRAWINGS

In drawings which illustrate an embodiment of the invention.

DETAILED DESCRIPTION OF THE PREFERRED EMBODIMENT

Figure 1:
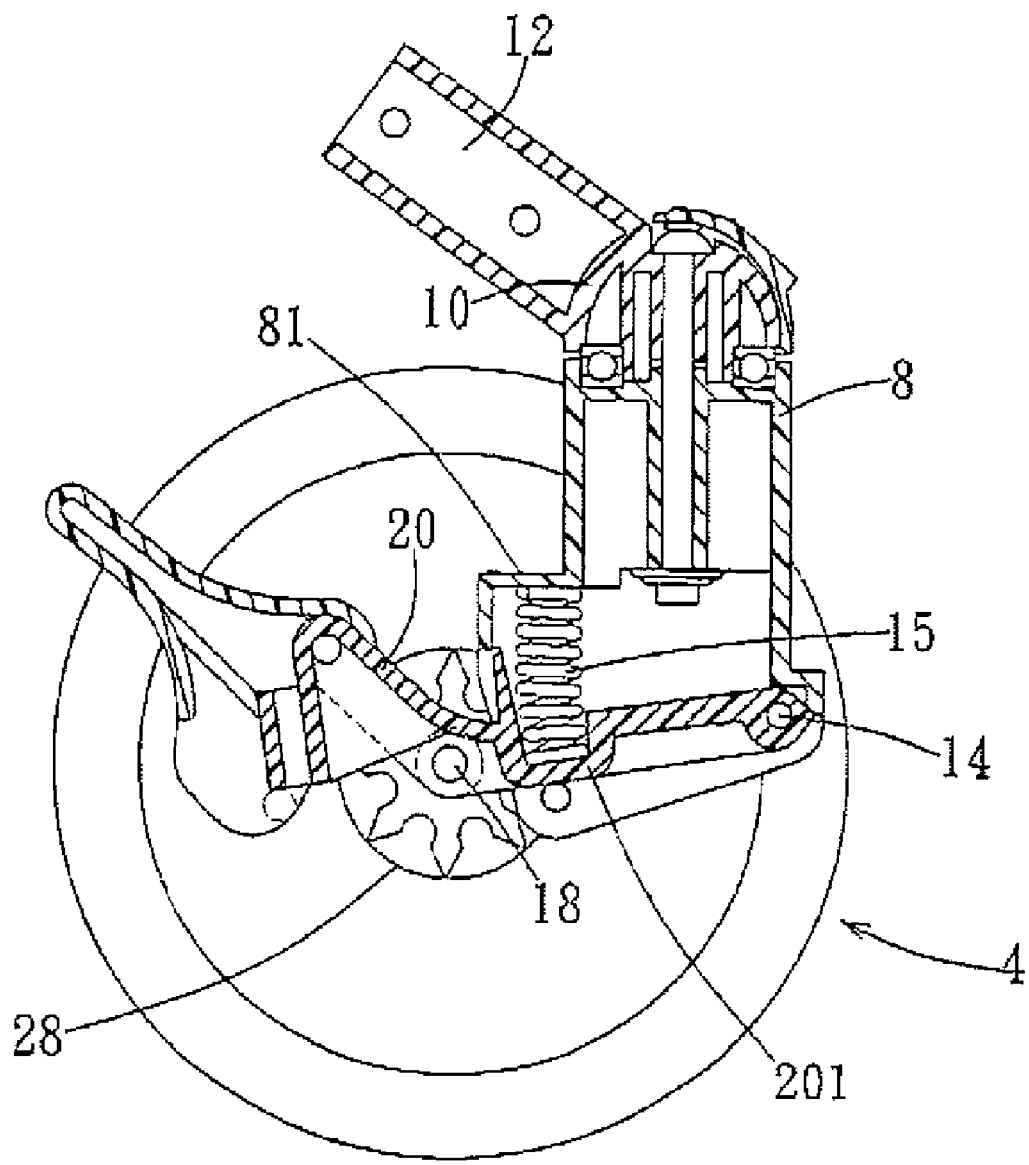
FIG. 1 is a sectional view of a conventional wheel assembly.
Figure 2:
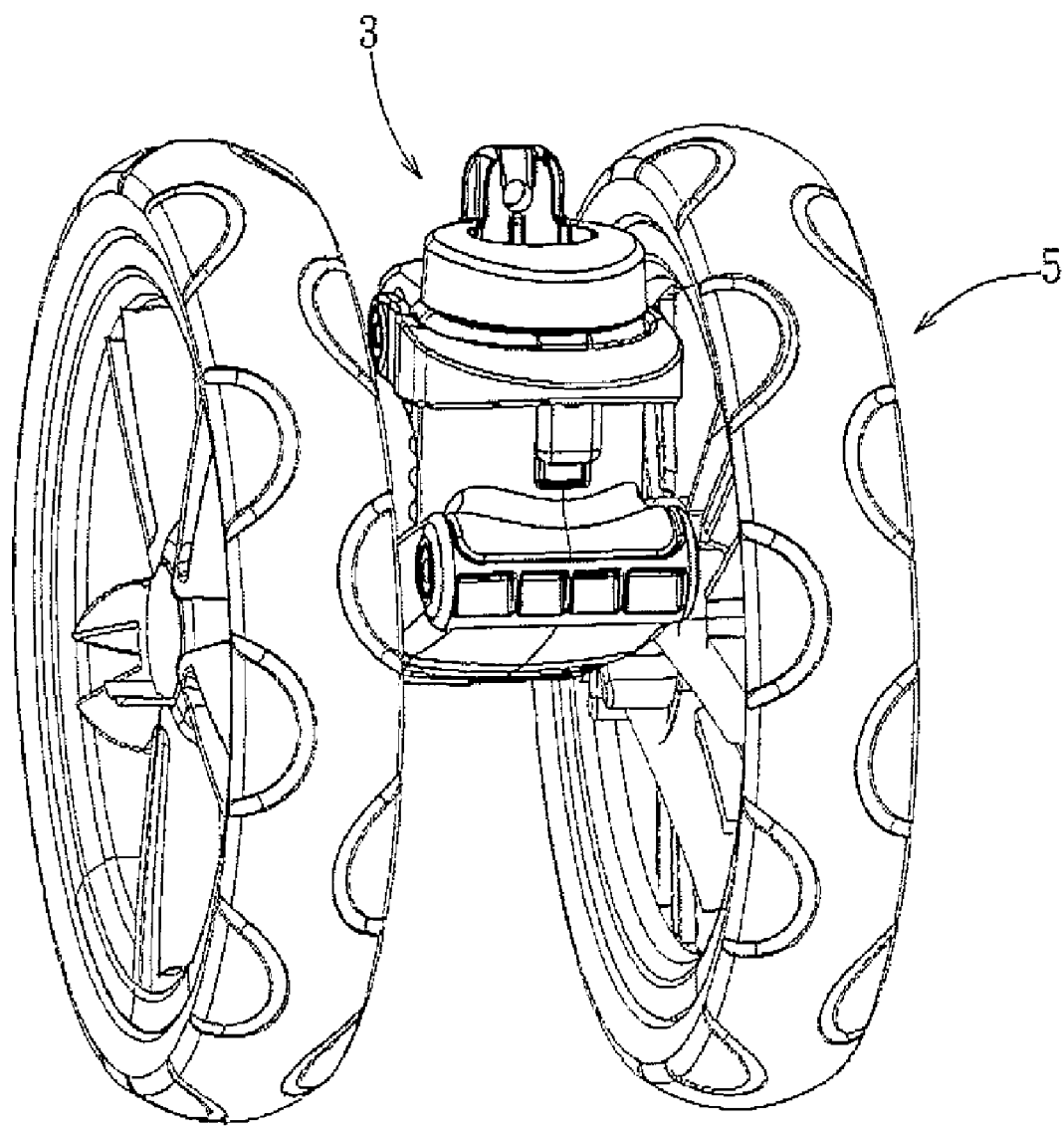
FIG. 2 is a perspective view of the preferred embodiment of a wheel assembly according to this invention.
Figure 3:
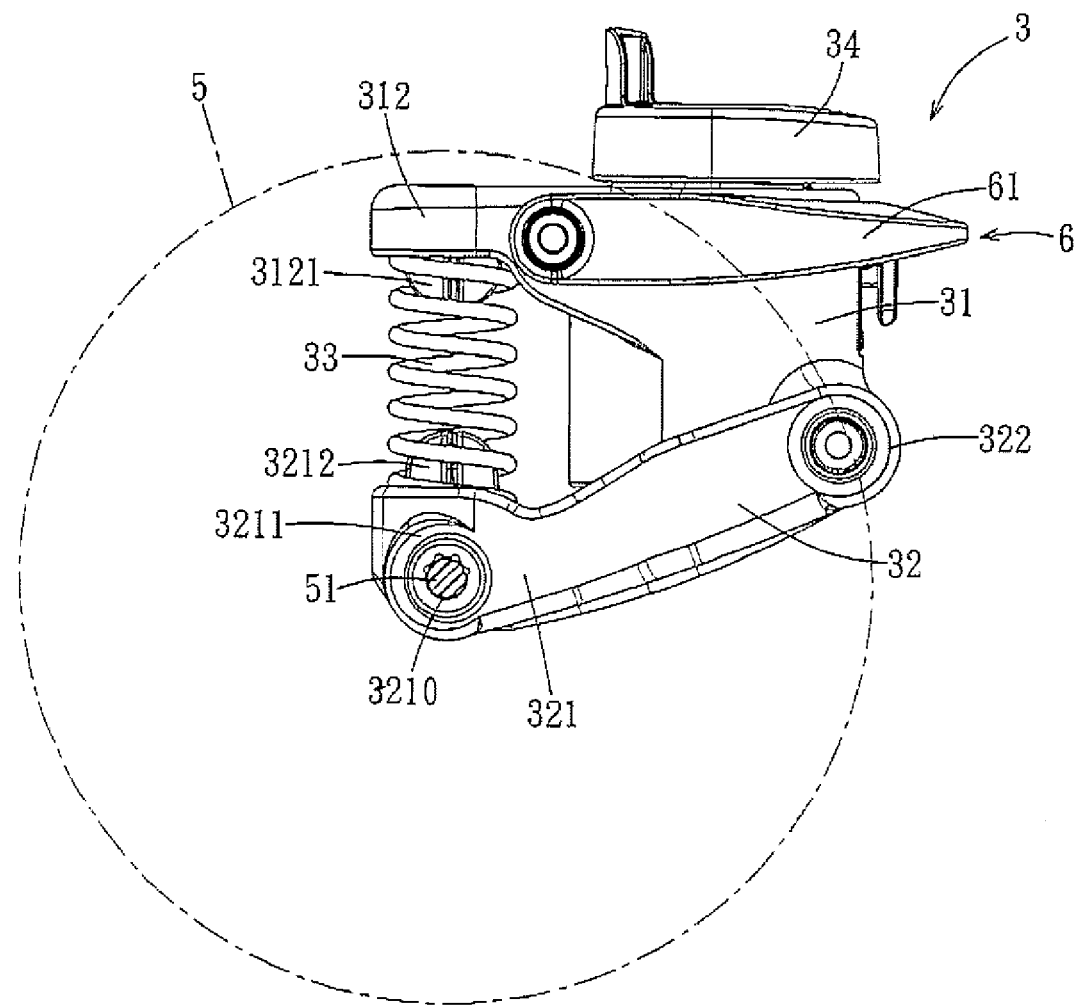
FIG. 3 is a schematic side view to illustrate the configuration of a shock-absorbing device of the preferred embodiment.

FIGS. 2 to 5 illustrate the preferred embodiment of a wheel assembly according to this invention for hand-operated vehicles, such as a stroller, a wheelchair, and the like. The wheel assembly includes a pair of wheels 5 having a wheel axle 51 connected thereto, and a shock-absorbing device 3.

The shock-absorbing device 3 includes: a wheel mounting seat 31 including a sleeve part 311 having upper and lower end portions 3111, 3112 and first and second sides 3113, 3114, and an extending part 312 extending outwardly and laterally from the first side 3113 of the sleeve part 311 at the upper end portion 3111 of the sleeve part 311; a shock-absorber seat 32 having a first end portion 321 that is formed with a wheel axle-disposing hole 3210 for extension of the wheel axle 51 therethrough, and a second end portion 322 that is pivoted to the second side 3114 of the sleeve part 311 at the lower end portion 3112 of the sleeve part 311, the wheel axle-disposing hole 3210 being defined by an axle hole-defining wall 3211; and a resilient shock absorber 33 mounted to the extending part 312 and the first end portion 321 of the shock-absorber seat 32 and abutting resiliency against the extending part 312 and the axle hole-defining wall 3211 of the wheel axle-disposing hole 3210.

In this embodiment, the resilient shock absorber 33 includes a compression spring 331 extending between and abutting resiliently against the extending part 312 and the axle hole-defining wall 3211.

Figure 4:
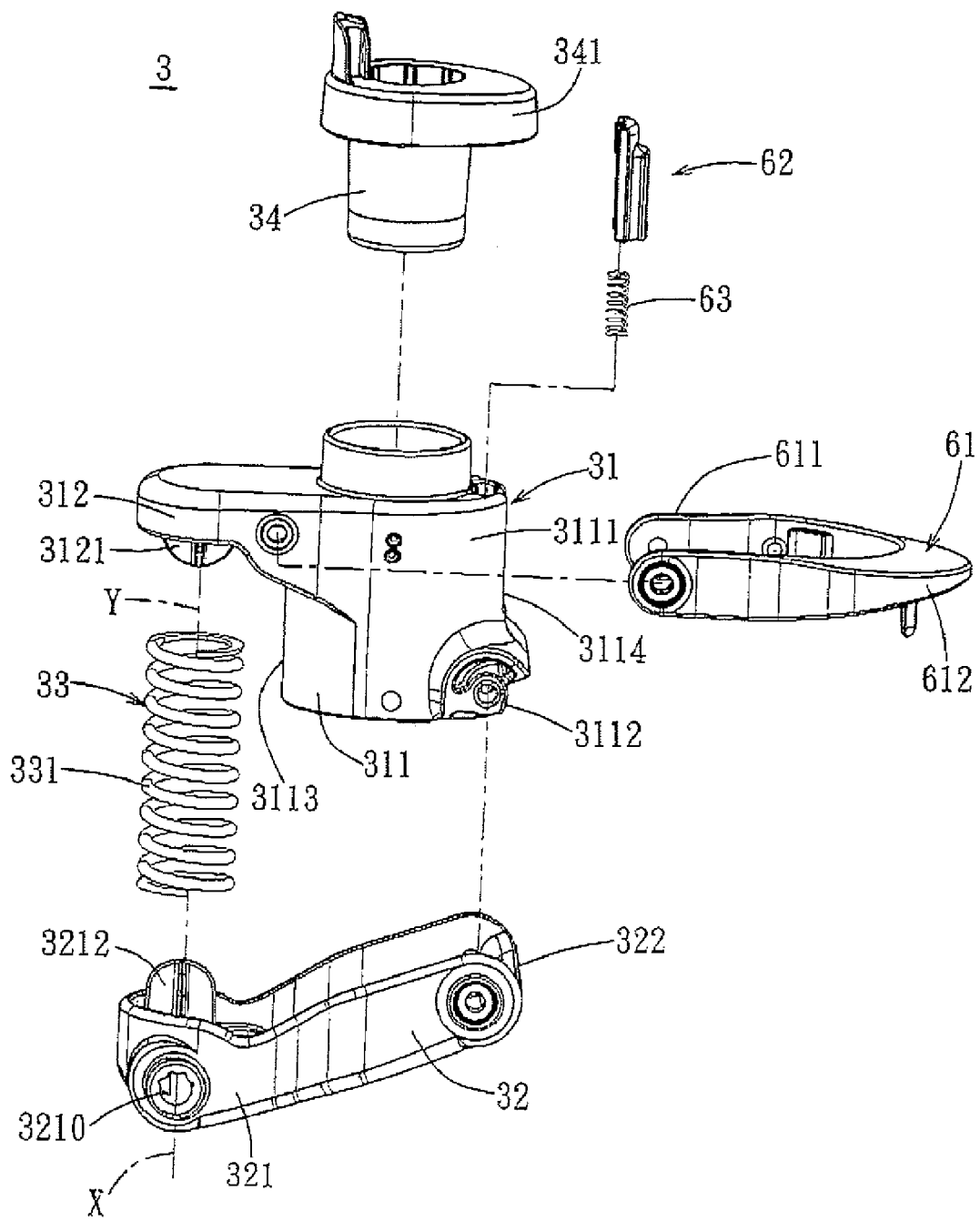
FIG. 4 is an exploded perspective view of the shock-absorbing device of the preferred embodiment.
Figure 5:
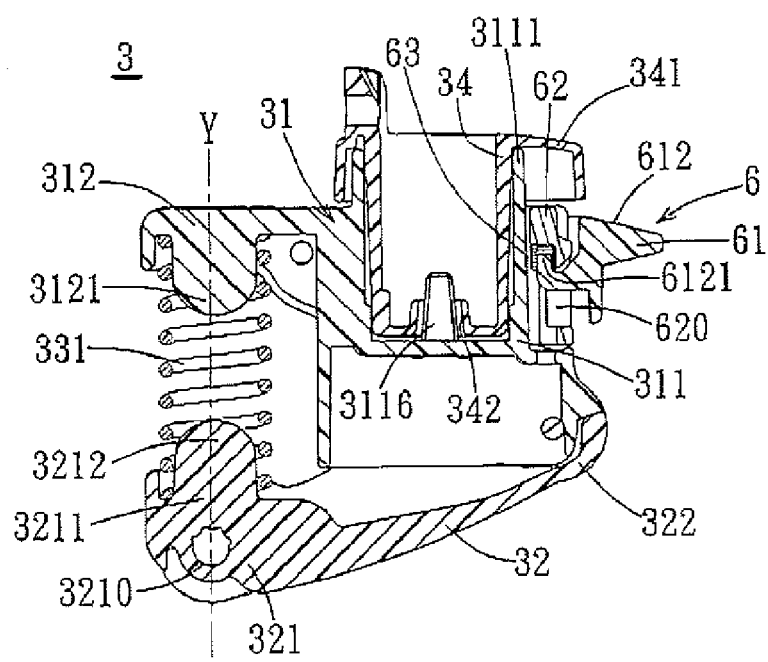
FIG. 5 is a sectional side view to illustrate a normal state of the shock-absorbing device and an unlocked state of a locking unit of the preferred embodiment.

The wheel axle-disposing hole 3210 defines a wheel axis (X) (see FIG. 4). The extending part 312 is formed with a first protrusion 3121 protruding downwardly therefrom. The axle hole-defining wall 3211 is formed with a second protrusion 3212 protruding upwardly therefrom and aligned with the first protrusion 3121 along a vertical axis (Y) that is perpendicular to and that passes through the wheel axis (X). The compression spring 331 is sleeved on the first and second protrusions 3121, 3212.

Figure 6:
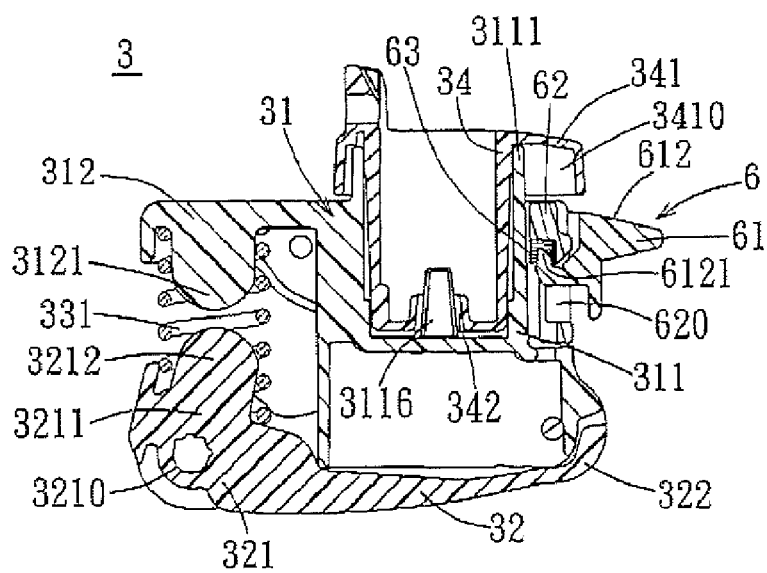
FIG. 6 is a sectional side view to illustrate a shock state of the shock-absorbing device and the unlocked state of the locking unit of the preferred embodiment.
Figure 7:
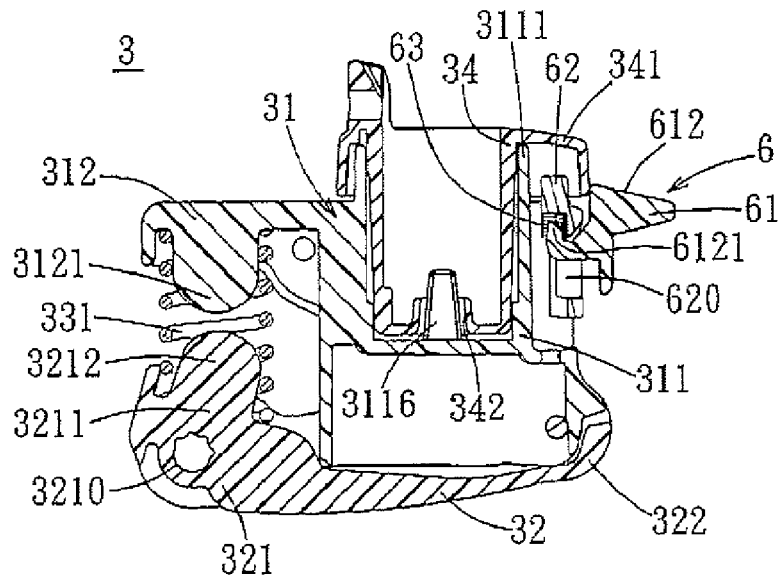
FIG. 7 is a sectional side view to illustrate the shock state of the shock-absorbing device and a locked state of the locking unit of the preferred embodiment.

The shock-absorbing device 3 further includes a leg mounting seat 34 adapted to be sleeved on a vehicle leg (not shown). The sleeve part 311 of the wheel mounting seat 31 is sleeved on the leg mounting seat 34. The leg mounting seat 34 is formed with a brim 341 protruding therefrom, extending outwardly and laterally from the second side 3114 of the sleeve part 311 at the upper end portion 3111 of the sleeve part 311, and cooperating with the sleeve part 311 to form a retaining groove 3410 therebetween. The shock-absorbing device 3 further includes a locking unit 6 including an operating lever 61 that is rotatable relative to the wheel mounting seat 31 between upper and lower positions (see FIGS. 7 and 6) and that has a first end portion 611 pivoted to the extending part 312, and a second end portion 612 disposed at the second side 3114 of the sleeve part 311. The locking unit 6 further includes a latch 62 that is connected to the second end portion 612 of the operating lever 61 so as to be co-rotatable therewith. The latch 62 engages releasably the retaining groove 3410 when the operating lever 61 is disposed at the upper position (see FIG. 7), thereby preventing rotation of the wheel mounting seat 31 relative to the vehicle leg, and disengages the retaining groove 3410 when the operating lever 61 is disposed at the lower position (see FIG. 6), thereby permitting rotation of the wheel mounting seat 31 relative to the vehicle leg. In this embodiment, the latch 62 is formed with a vertical hole 620, and the second end portion 612 of the operating lever 61 is formed with an L-shaped protrusion 6121 fitted into the vertical hole 620 in the latch 62. A resilient buffering member 63 is disposed in the vertical hole 620 in the latch 62, and is sleeved on an end segment of the L-shape protrusion 6121 for providing a buffering effect upon movement of the operating lever 61 from the lower position to the upper position. The resilient buffering member 63 is preferably a compression spring.

Figure 8:
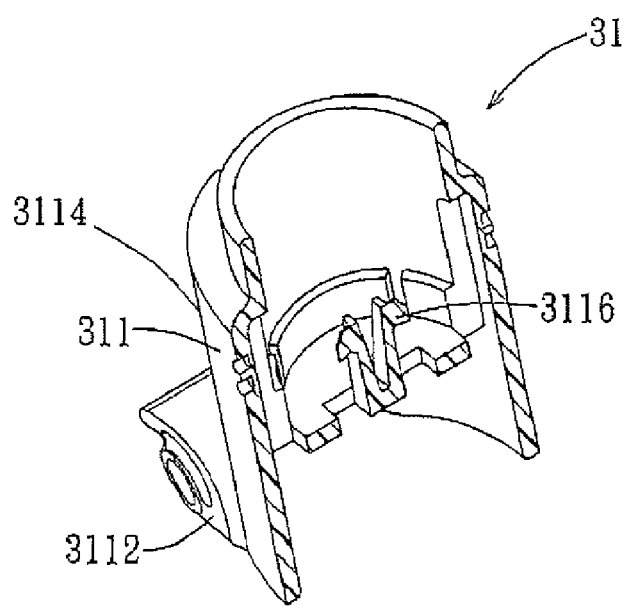
FIG. 8 is a sectional view of a wheel mounting seat of the shock-absorbing device of the preferred embodiment.

The sleeve part 311 of the wheel mounting seat 31 is further formed with an inner protrusion 3116 (see FIG. 8). The leg mounting seat 34 is formed with an inner ring 342 sleeved on the inner protrusion 3116 of the sleeve part 311 so as to mount the leg mounting seat 34 to the sleeve part 311.

In use, the first end portion 321 of the shock-absorber seat 32 is moved upwardly toward the extending part 312 from a normal position (see FIG. 5) to a shock absorbing position (see FIG. 6) and compresses the compression spring 331 so as to absorb the shock incurred during movement of the wheel assembly on an uneven surface. Since the axle hole-defining wall 3211, on which the force resulting from the shock acts, is supported by the wheel axles 51, the aforesaid drawback associated with the prior art can be eliminated.

With the invention thus explained, it is apparent that various modifications and variations can be made without departing from the spirit of the present invention. It is therefore intended that the invention be limited only as recited in the appended claims.

What is claimed is:

1. A shock-absorbing device adapted to be connected to a vehicle leg of a stroller, comprising:
    a wheel mounting seat including a sleeve part having first and second sides, and an extending part extending outwardly from said first side of said sleeve part;
    a shock-absorber seat having a first end portion that is formed with a wheel axle-disposing hole adapted for extension of a wheel axle therethrough, and a second end portion that is pivoted to said second side of said sleeve part, said wheel axle-disposing hole being defined by an axle hole-defining wall;
    a resilient shock absorber abutting resiliently against said extending part and said axle hole-defining wall; and
    a locking unit including an operating lever that is rotatable relative to said wheel mounting seat between an upper position so as to prevent rotation of said wheel mounting seat relative to the vehicle leg, and a lower position so as to permit rotation of said wheel mounting seat relative to the vehicle leg.

2. The shock-absorbing device of claim 1, wherein said sleeve part further has upper and lower end portions, said extending part extending laterally from said upper end portion of said sleeve part, said second end portion of said shock-absorber seat being pivoted to said lower end portion of said sleeve part.

3. The shock-absorbing device of claim 1, wherein said resilient shock absorber includes a compression spring extending between and abutting resiliently against said extending part and said axle hole-defining wall.

4. The shock-absorbing device of claim 3, wherein said wheel axle-disposing hole defines a wheel axis, said extending part being formed with a first protrusion protruding therefrom, said axle hole-defining wall being formed with a second protrusion protruding therefrom and aligned with said first protrusion along a vertical axis that is perpendicular to and that passes through said wheel axis, said compression spring being sleeved on said first and second protrusions.

5. The shock-absorbing device of claim 1, further comprising a leg mounting seat adapted to be sleeved on the vehicle leg, said sleeve part of said wheel mounting seat being sleeved on said leg mounting seat.

6. The shock-absorbing device of claim 5, wherein said leg mounting seat is formed with a brim protruding therefrom, extending outwardly from said second side of said sleeve part, and cooperating with said sleeve part to form a retaining groove therebetween, said locking unit of said shock-absorbing device having a first end portion pivoted to said extending part, and a second end portion disposed at said second side of said sleeve part, said locking unit further including a latch that is connected to said second end portion of said operating lever so as to be co-rotatable therewith, said latch engaging releasably said retaining groove when said operating lever is disposed at the upper position, and disengaging said retaining groove when said operating lever is disposed at the lower position.

7. The shock-absorbing device of claim 6, wherein said latch is formed with a vertical hole, said second end portion of said operating lever being formed with an L-shaped protrusion fitted into said vertical hole in said latch.

8. The shock-absorbing device of claim 7, wherein said locking unit further includes a resilient buffering member disposed in said vertical hole in said latch and sleeved on an end segment of said L-shape protrusion for providing a buffering effect.

9. A wheel assembly for a stroller, comprising:
    a wheel with a wheel axle; and
    a shock-absorbing device including
        a wheel mounting seat including a sleeve part having first and second sides, and an extending part extending outwardly from said first side of said sleeve part,
        a shock-absorber seat having a first end portion that is formed with a wheel axle-disposing hole for extension of said wheel axle therethrough, and a second end portion that is pivoted to said second side of said sleeve part, said wheel axle-disposing hole being defined by an axle hole-defining wall, and
        a resilient shock absorber abutting resiliently against said extending part and said axle hole-defining wall, wherein said wheel axle-disposing hole defines a wheel axis, said extending part being formed with a first protrusion protruding therefrom, said first end portion of said shock-absorber seat being formed with a second protrusion protruding therefrom and aligned with said first protrusion along a vertical axis that is perpendicular to and that passes through said wheel axis, said resilient shock absorber being sleeved on said first and second protrusions.

10. The wheel assembly of claim 9, wherein said resilient shock absorber includes a compression spring extending between and abutting resiliently against said extending part and said axle hole-defining wall.

* * * * *